United States Patent [19]

Fernsler

[11] Patent Number: 6,114,817
[45] Date of Patent: Sep. 5, 2000

[54] POWER SUPPLY FOR A DEFLECTION CIRCUIT OPERATING AT MULTI-SCAN FREQUENCIES

[75] Inventor: Ronald Eugene Fernsler, Indianapolis, Ind.

[73] Assignee: Thomson Licensing S.A., Boulogne, Cedex, France

[21] Appl. No.: 09/131,849

[22] Filed: Aug. 7, 1998

[51] Int. Cl.[7] .................. G09G 1/04; H01J 29/70
[52] U.S. Cl. ............. 315/411; 315/395; 315/408
[58] Field of Search ................... 315/411, 395, 315/408, 369

[56] References Cited

U.S. PATENT DOCUMENTS

| | | | |
|---|---|---|---|
| 4,516,169 | 5/1985 | Truskalo | 358/190 |
| 4,588,929 | 5/1986 | Wedam et al. | 315/395 |
| 4,633,146 | 12/1986 | Bagcock et al. | 315/395 |
| 4,645,990 | 2/1987 | Willis | 315/411 |
| 4,651,214 | 3/1987 | Rodriguez-Cavazos | 315/411 |
| 4,829,414 | 5/1989 | Yook | 363/20 |
| 4,831,311 | 5/1989 | Yug | 315/411 |
| 5,089,947 | 2/1992 | Driscoll et al. | 363/20 |
| 6,011,706 | 1/2000 | Adragna et al. | 363/41 |

FOREIGN PATENT DOCUMENTS 0 288 312 B1  10/1988  European Pat. Off. ....... H04N 3/185

*Primary Examiner*—Seungsook Ham
*Assistant Examiner*—John Patti
*Attorney, Agent, or Firm*—Joseph S. Tripoli; Joseph J. Laks; Sammy S. Henig

[57] ABSTRACT

A television apparatus set has the capability of selectively displaying picture information obtained from a broadcast television signal and a display monitor data signal. A zero voltage switching switch mode power supply generates a higher voltage B+ supply voltage for a horizontal deflection circuit output stage, when the deflection circuit output stage operates at a rate greater than or equal to approximately 32 KHz. A series-pass regulator power supply generates at a common supply terminal a lower voltage B+ supply voltage, when the deflection circuit output stage operates at a lower rate equal to approximately 16 KHz. During a start-up interval, the horizontal scanning output stage is supplied with the lower B+ supply voltage regardless of the scan frequency for reducing excessive stress in the horizontal output stage switching transistor to improve reliability.

13 Claims, 3 Drawing Sheets

POWER SUPPLY FOR A DEFLECTION CIRCUIT OPERATING AT MULTI-SCAN FREQUENCIES

The invention relates to a power supply for a deflection circuit output stage.

BACKGROUND OF THE INVENTION

A television receiver may have the capability of selectively displaying picture information in the same color cathode ray tube (CRT) using a deflection current at different horizontal scan frequencies. For example, when displaying the picture information of a television signal according to the broadcasting standard, it may be more economical to utilize a horizontal deflection current at a rate of approximately 16 KHz, referred to as the 1 H rate. Whereas, when displaying the picture information of a high definition television signal or a display monitor data signal, the rate of the horizontal deflection current may be equal to or greater than 32 KHz, referred to as 2nH, where n is equal to or greater than 1.

It is well known to vary the magnitude of the supply voltage of the horizontal deflection circuit output stage, in accordance with the selected horizontal rate of the deflection current, for obtaining similar picture widths using the same horizontal deflection winding.

In a zero voltage switching (ZVS) type of a switch mode power supply (SMPS), the power transistor is turned on when the voltage across its terminals is approximately zero. Advantageously, a ZVS SMPS supplies regulated voltage with a high efficiency or low power dissipation. When a wide range of supply voltages is required, as in the television receiver discussed above, disadvantageously, a ZVS SMPS may not provide the zero voltage switching feature over the entire output voltage range.

In accordance with an inventive feature, a first power supply that includes a first power transistor generates a supply voltage for a deflection circuit output stage, when the deflection circuit output stage operates in a first deflection frequency. A second power supply that includes a second power transistor generates the supply voltage, when the deflection circuit output stage operates in a second deflection frequency. Each of the first and second power supplies selectively generates the supply voltage at a common terminal.

In carrying out a further inventive feature, the first power supply operates as a ZVS SMPS. The ZVS SMPS supplies power when the deflection frequency is at a relatively narrow range of frequencies such as 2nH. Whereas, the second power supply, for example, a series pass regulator power supply, supplies the power when the deflection frequency is at 1 H. Therefore, advantageously, the ZVS SMPS operates in a substantially narrower range of output voltages than without the series pass regulator power supply.

Advantageously, because only one of the first and second power supplies selectively energizes the output stage at any given time, the first and second power transistors can share a common heat sink arrangement. Therefore, advantageously, the dissipated power removal capability of the heat sink arrangement need not exceed the requirement of only that one of the power transistors that dissipates the greater power.

A video display deflection apparatus, embodying an inventive feature, is capable of slelectively operating at a deflection frequency selected from a range of frequencies. It includes a source of a synchronization signal at a frequency indicative of the selected frequency. A deflection circuit output stage is responsive to the synchronization signal for generating a deflection current at the selected deflection frequency. A first power supply including a first power transistor is used for generating a first supply voltage by the operation of the first power transistor when a first deflection frequency is selected. A second power supply including a second power transistor is used for generating a second supply voltage by the operation of the second power transistor when a second deflection frequency is selected. A source of a signal indicative of a frequency of the synchronization signal is used for generating a first control signal that is coupled to one of the first and second power supplies. The first supply voltage is selected, in accordance with the first control signal to energize the deflection circuit output stage, when the first deflection frequency is selected. The second supply voltage is selected, when the second deflection frequency is selected. When the first supply voltage energizes the output stage, the second power transistor is outside a supply current path of the output stage. When the second supply voltage energizes the output stage, the first power transistor is outside the supply current path of the output stage.

DETAILED DESCRIPTION

Figure 1A:
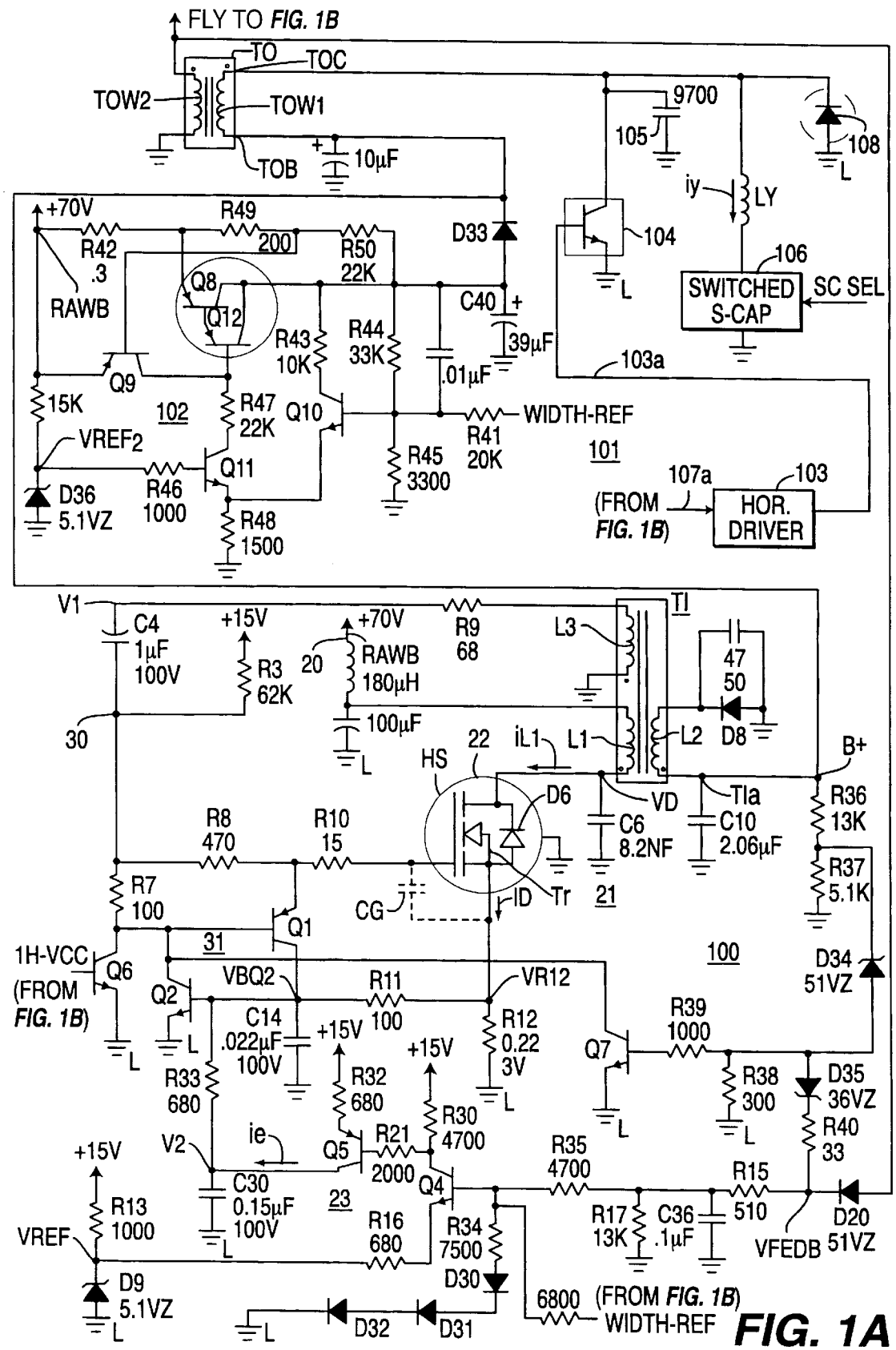
FIG. 1A illustrates a horizontal deflection circuit output stage selectively energized by a tuned SMPS and a series-pass regulator, in accordance with an inventive feature.

FIG. 1A illustrates a horizontal deflection circuit output stage 101 of a television receiver having multi-scan frequency capability. Stage 101, in accordance with an inventive feature, is selectively energized by a tuned, switch mode power supply of the zero voltage switching type (ZVS SMPS) 100 and a series-pass regulator power supply 102. A driver stage 103 is responsive to an input signal 107a at the selected horizontal scanning frequency and generates a drive control signal 103a to control the switching operation in a switching transistor 104 of output stage 101. Driver stage 103 is capable of providing horizontal base current at controllable amplitudes over a wide frequency range. The collector of transistor 104 is coupled to a terminal T0C of a primary winding T0W1 of a flyback transformer T0. End terminal T0C of winding T0W1 is coupled to a non-switched retrace capacitor 105 and to a horizontal deflection winding LY having a fixed value to form a retrace resonant circuit, during horizontal retrace interval, in a conventional manner. End terminal T0C of winding T0W1 is also coupled to a conventional damper diode 108. A conventional bank of switched S-capacitors 106 is coupled in series with winding LY for selectively coupling S-capacitors, not shown, to winding LY, in accordance with a selection control signal SCSEL.

In a standard receiver broadcast mode of operation of the television receiver, the frequency of a horizontal deflection current iy in winding LY is at the 1 H rate of approximately 16 KHz. In a high definition television mode of operation of the television receiver, the frequency of horizontal deflection current iy is 2.14 times higher, referred to as 2.14 H. In a monitor mode of operation, the frequency of horizontal deflection current iy is selected from a range between 2 H and 2.4 H.

ZVS SMPS 100 generates a supply voltage B+ that is coupled to terminal T0B of transformer T0 and includes an N-type, metal oxide semiconductor (MOS) power transistor Tr operating as a transistor switch. Transistor Tr has a drain electrode coupled through a primary winding L1 of a transformer T1 to a terminal 20 of a direct current (DC) input supply voltage RAWB. Voltage RAWB is derived from, for example, a filter capacitor coupled to a bridge rectifier that rectifies a mains supply voltage and followed by a voltage regulator, not shown.

A source electrode of transistor Tr is coupled via a current sensor or sampling resistor R12. A damper diode D6 operating as a switch is coupled in parallel with transistor Tr and is included in the same package with transistor Tr to form a bi-directional switch 22. A flyback capacitor C6 is coupled in parallel with diode D6 and in series with a winding L1 of a transformer T1 to form with an inductance of winding L1 a resonant circuit 21 when switch 22 is non conductive.

A secondary winding L2 of transformer T1 is coupled to a cathode of a peak rectifying diode D8 having an anode that is coupled to ground for generating supply voltage B+ in a filter capacitor C10 that is coupled to a terminal T1a of winding L2. Voltage B+ is coupled to terminal T0B of winding T0W1.

A diode D20 rectifies a voltage developed in a secondary winding T0W2 of transformer T0 to generate a voltage VFEDB that is proportional to voltage B+. Voltage VFEDB is coupled to a voltage divider formed by resistors R15 and R17. A voltage VSENSE is developed across a filter capacitor C36 that is coupled in parallel with resistor R17. Voltage VSENSE is coupled to a base of a transistor Q4 of an error amplifier 23 via a second voltage divider that includes a resistor R35 and a series arrangement of a resistor R34, a diode D30, a diode D31 and a Diode D32.

An emitter electrode of transistor Q4 is coupled via a gain determining resistor R16 to a zener diode D9 that develops a reference voltage VREF of error amplifier 23. Diode D9 is energized via a resistor R13 from a supply voltage of 15 V. A collector of transistor Q4 is coupled to a collector load resistor R30 and to a base of a common emitter amplifier transistor Q5 via a resistor R31. A gain determining resistor R32 is coupled to the emitter of transistor Q5. The collector of transistor Q5 is coupled to a filter capacitor C30 and to a base of a comparator transistor Q2 via a resistor R33. An error collector current Ie of transistor Q5 is indicative of a difference between a portion of voltage VSENSE and reference voltage VREF.

A voltage VR12, developed in current sensing resistor R12 is coupled via a resistor R11 to a base electrode of comparator transistor Q2. Transistor Q2 is turned on, during each cycle, when a base voltage VBQ2 of transistor Q2 becomes equal to the forward voltage of the base-emitter junction of transistor Q2. Voltage VBQ2 includes a first portion that is proportional to a source-drain current ID in transistor Tr. An error feedback voltage V2 in capacitor C30 is coupled via resistor R33 to the base of transistor Q2 to develop a second portion of voltage VBQ2.

The collector electrode of transistor Q2 is coupled to the base electrode of a transistor Q1 and the collector electrode of transistor Q1 is coupled to the base electrode of a transistor Q2 to form a regenerative switch 31. A control voltage VG of transistor Tr is developed at the emitter of transistor Q1 that forms an output terminal of regenerative switch 31 and is coupled to the gate electrode of transistor Tr via a resistor R10.

A secondary winding L3 of transformer T1 is coupled via a resistor R9 for producing an alternating current (AC) voltage V1. Voltage V1 is AC-coupled via a capacitor C4 and a resistor R8 to the emitter of transistor Q1 to generate drive voltage VG of transistor Tr. AC-coupled voltage V1 is coupled via a collector resistor R7 to the collector electrode of transistor Q2 and to the base electrode of transistor Q 1.

A resistor R3 coupled between the source of supply voltage of +15V and a terminal 30 of capacitor C4 that is remote from winding L3 charges capacitor C4 upon power on or start up. When voltage VG on the gate electrode of transistor Tr exceeds a threshold voltage of MOS transistor Tr, Transistor Tr conducts causing a drain voltage VD of transistor Tr to decrease. As a result, voltage V1 becomes positive and reinforces voltage VG for maintaining transistor Tr, in a positive feedback manner, fully turned on.

Figure 1B:
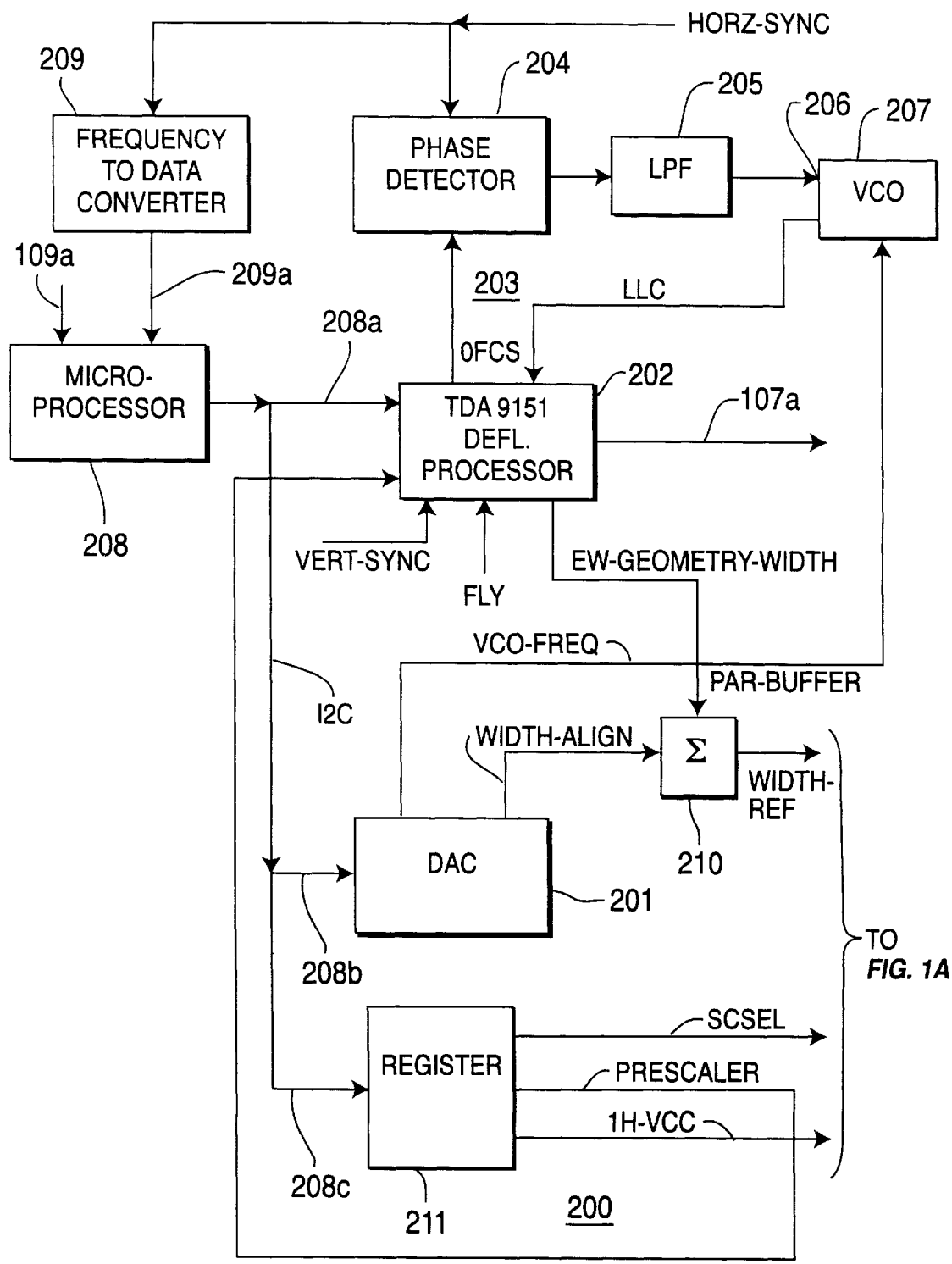
FIG. 1B illustrates a control circuit of the arrangement of FIG. 1A.
Figure 2A:
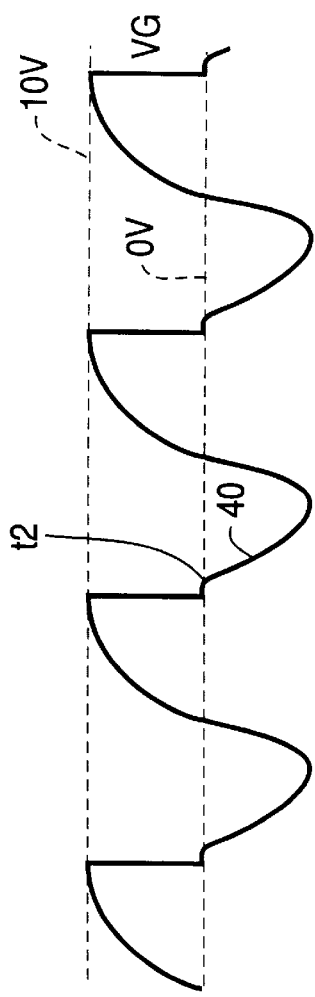
FIGS. 2a–2c illustrate waveforms useful for explaining the operation of the tuned SMPS of FIG. 1A.
Figure 2B:
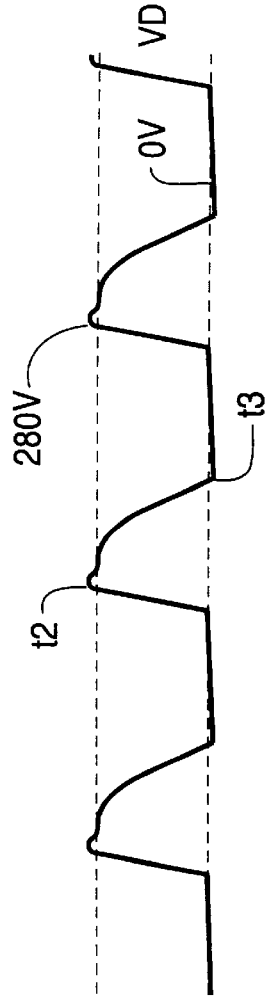
Figure 2C:
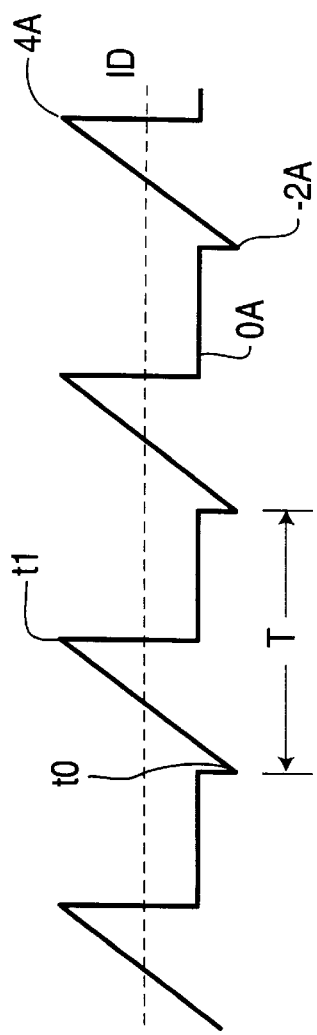

FIGS. 2a–2c illustrate wave forms useful for explaining the operation of tuned ZVS SMPS 100 of FIG. 1A. Similar symbols and numerals in FIGS. 1A, 1B and 2a–2c indicate similar items or functions.

During an interval t0–t1 of a given period T of FIG. 2c, current ID of conductive transistor Tr of FIG. 1A is up-ramping. Consequently, a corresponding non-resonant current pulse portion of a current IL1 in winding L1 is up-ramping and stores magnetic energy in the inductance associated with winding L1 of transformer T1. At time t1 of FIG. 2c, voltage VBQ2 of FIG. 1A, containing an up-ramping portion derived from the voltage across resistor R12, exceeds a triggering level of regenerative switch 31 that is determined by voltage V2 and turns on transistor Q2. Current flows in the base of transistor Q1 and regenerative switch 31 applies a low impedance at the gate electrode of transistor Tr. Consequently, gate electrode voltage VG of FIG. 2a is reduced to near zero volts and turns off transistor Tr of FIG. 1A. When transistor Tr is turned off, drain voltage VD of FIG. 2b increases and causes voltage V1 of FIG. 1A that is coupled from winding L3 to decrease. The charge stored in gate-source capacitance CG maintains latch mode operation until time t2 of FIG. 2a.

When voltage VG becomes smaller than required to maintain sufficient collector current in transistor Q1 of FIG. 1A, a forward conduction on the base electrode of transistor Q2 ceases and, consequently, latch operation mode in regenerative switch 31 is disabled. Afterwards, voltage V1 that continues to decrease causes a negative portion 40 of voltage VG of FIG. 2a to maintain transistor Tr of FIG. 1A turned off.

When transistor Tr is turned off, drain voltage VD increases as shown in FIG. 2b. Capacitor C6 of FIG. 1A limits the rate of increase of voltage VD such that transistor Tr is completely nonconductive before voltage VD increases appreciably above zero voltage. Thereby, switching losses and radiated switching noise are, advantageously, reduced.

Resonant circuit 21 that includes capacitor C6 and winding L1 oscillates, during interval t1–t3 of FIG. 2b, when transistor Tr of FIG. 1A is turned off. Capacitor C6 limits the peak level of voltage VD. Therefore, advantageously, no snubber diode and resistor are needed so that efficiency is improved and switching noise is reduced.

The decrease in voltage VD prior to time t3 of FIG. 2b, causes voltage V1 of FIG. 1 to become a positive voltage. At time t3 of FIG. 2b, voltage VD is close to zero volts and slightly negative, causing damper diode D6 of FIG. 1 to turn on and to clamp voltage VD of FIG. 2b to approximately zero volts. Thus, resonant circuit 21 of FIG. 1A exhibits a half cycle of oscillation. After time t3 of FIG. 2b, voltage VG of FIG. 2a becomes increasingly more positive, because of the aforementioned change in polarity of voltage V1 of FIG. 1A.

Advantageously, the following turn on of transistor Tr is delayed by a delay time that is determined by the time constant of resistor R8 and gate capacitance CG until after time t3 of FIG. 2b when voltage VD is nearly zero volts. Therefore, minimal turn-on losses are incurred and switching noise is reduced.

Negative feedback regulation of voltage B+ is achieved by varying voltage V2 in filter capacitor C30. When the base voltage of transistor Q4 that is proportional to voltage B+ is larger than the sum of the forward voltage of the base-emitter junction of transistor Q4 and voltage VREF, current Ie charges capacitor C30 and increases base voltage VBQ2 of transistor Q2. Therefore, the threshold level of comparator transistor Q2 is decreased. Consequently, the peak value of current ID in transistor Tr and the power delivered to the load circuit are reduced. On the other hand, when the base voltage of transistor Q4 is smaller than the sum of the forward voltage of the base-emitter junction of transistor Q4 and voltage VREF, current Ie is zero and voltage VBQ2 decreased. Consequently, the peak value of current ID in transistor Tr and the power delivered to the load circuit are increased.

Tuned ZVS SMPS 100 operates in a current mode control, on a current-pulse by current-pulse control basis. The current pulse of current ID during interval t0–t1 of FIG. 2c, flowing in transistor Tr of FIG. 1A, terminates at time t1 of FIG. 2c when it reaches the threshold level of transistor Q2 of FIG. 1 that is established by error current Ie forming an error signal. The error signal actually controls the peak current of the current pulse of current ID that flows in the inductance of winding L1.

Voltage B+ is coupled to a voltage divider that includes a resistor R36 and a resistor R37. When a portion of voltage B+ that is developed in resistor R37 exceeds a breakdown voltage of a zener diode D34, that is indicative of excessive voltage B+, a portion of voltage B+, that is developed across a resistor R38, is coupled to a base of a transistor Q7 via a resistor R39 to turn on transistor Q7. Similarly, when voltage VFEDB is excessive, voltage VFEDB is coupled to the base of a transistor Q7 via a resistor R40 and a zener diode D35 to turn on transistor Q7. Generation of voltage B+ is disabled when transistor Q7 is conductive. The collector of transistor Q7 is coupled to the base of transistor Q1 for turning on latch 31 when transistor Q7 is conductive to disable ZVS SMPS 100 for providing fault protection.

Generation of voltage B+ is also disabled when a control signal 1H-VCC that is coupled to the base of a transistor Q6 causes transistor Q6 to be conductive. The collector of transistor Q6 is coupled to the base of transistor Q1 for turning on latch 31 when transistor Q6 is conductive.

The magnitude of voltage B+ is controlled by a control signal WIDTH-REF and varies in the range of –0.29V, when the horizontal scan frequency of output stage 101 is 2 H and –4V, when the horizontal scan frequency of output stage 101 is 2.4 H. Control signal WIDTH-REF has a component at a vertical rate for varying voltage B+in a vertical rate parabolic manner to provide for East-West distortion correction.

Series-pass regulator power supply 102 includes a series pass power transistor Q8 having a collector coupled to terminal T1a of winding L2 of transformer T1 via a diode D33. A current limiting resistor R42 couples input supply voltage RAWB to an emitter of power transistor Q8. The collector of transistor Q8 is coupled to a filter capacitor C40 and to the anode of diode D33. The voltage developed at the collector of transistor Q8 is coupled to a collector of a transistor Q10 via a collector resistor R43. The collector of transistor Q8 is additionally coupled to a base of transistor Q10 via a voltage divider feedback network that includes a resistor R44 and a resistor R45.

A transistor Q11 is coupled to transistor Q10 to form a differential, error amplifier. The base electrode of transistor Q11 is coupled via a resistor R46 to a zener diode D36 for providing a reference voltage VREF2. A collector electrode of transistor Q11 is coupled via a resistor R47 to a base of a transistor Q12 that is coupled to transistor Q8 in a Darlington configuration. The emitters of transistors Q10 and Q11 are coupled to a common emitter resistor R48.

Series-pass regulator power supply 102 regulates voltage B+, in accordance with reference voltage VREF2, in a conventional manner. For example, an increase in the collector voltage of transistor Q8 causes transistor Q11 to conduct less in a manner to reduce the voltage increase in a negative feedback manner. Control signal WIDTH-REF is coupled to the base of transistor Q10 via a resistor R41 for varying voltage B+, produced by power supply 102, as explained later on, in a vertical rate parabolic manner to provide for East-West distortion correction in output stage 101.

A resistor R49 and a resistor R50 are coupled in series with resistor R42 to form a current path between a terminal where input supply voltage RAWB is developed and the collector of transistor Q8. A junction terminal 102a between resistors R49 and R50 is coupled to a base of a protection transistor Q9, embodying an inventive feature. The emitter of transistor Q9 is coupled to voltage RAWB and its collector is coupled to the base of transistor Q12. During normal operation transistor Q9 is turned off.

Assume that as a result of a fault in, for example, output stage 101, an over current condition occurs in transistor Q8 that causes a sufficiently large voltage drop across resistor R42 to turn on transistor Q9. Therefore, a collector current in conductive transistor Q9 causes the base voltage of transistor Q8 to increase and a collector voltage of transistor Q8 to decrease.

The decrease in the collector voltage of transistor Q8 is applied in a positive feedback manner to the base of transistor Q9 via resistor R50 to cause an increase in collector current of transistor Q9. By regenerative action, the collector voltage of transistor Q8 further decreases. The result is that transistor Q8 is turned off and remains turned off by a latching operation. Thereby, an over-current protection is obtained.

ZVS SMPS 100 is enabled by control signal 1H-VCC. When ZVS SMPS 100 is enabled, the magnitude of voltage B+ that is produced at the cathode of diode 33 exceeds the anode voltage of diode D33 or the collector voltage of transistor Q8. Therefore, diode D33 disconnects power supply 102 from terminal T1a of winding L2 and no power is supplied to output stage 101 from power supply 102.

In carrying out a further inventive feature, when the horizontal scan frequency of current iy in output stage 101 is 1 H, ZVS SMPS 100 is disabled by control signal 1H-VCC; therefore, the magnitude of voltage B+ that is produced at the cathode of diode 33 is smaller than the anode voltage of diode D33. Consequently, power supply 102 is coupled to terminal T1a of winding L2 to energize output stage 101 via power transistor Q8. ZVS SMPS 100 is enabled and power transistor Tr applies power to output stage 101, when the horizontal scan frequency of output stage 101 is between 2 H and 2.4 H.

ZVS SMPS 100 supplies the power when the deflection frequency is at 2nH that is a relatively narrow range of frequencies. Whereas, series pass regulator power supply 102 supplies the power when the deflection frequency is at 1 H. Zero voltage switching and its associated advantages would have been compromised if the range of voltages that ZVS SMPS 100 is required to regulate had been wide. Therefore, advantageously, by using power supply 102 to energize stage 101 when the scan frequency is 1 H, ZVS SMPS 100 operates in a substantially narrower range of frequencies than is required without series pass regulator power supply 102. Consequently, the zero voltage switching feature is not compromised.

Advantageously, because, during operation, only one of power transistors Tr and Q8 selectively provides power to output stage 101, both share a common heat sink arrangement HS. Advantageously, the dissipated power removal capability of heat sink arrangement HS need not exceed the requirement of only that power transistors that dissipates the greater power.

FIG. 1B illustrates a control circuit 200 of the arrangement of FIG. 1A. Similar symbols and numerals in FIGS. 1A,1B and 2a–2c indicate similar items or functions. In FIG. 1B, control circuit 200 includes a conventional phase-lock-loop (PLL) 203 having a phase detector 204 coupled to a low-pass-filter 205. Low-pass-filter 205 is coupled to a frequency control input 206 of a voltage controlled-oscillator (VCO) 207. VCO 207 generates a signal LLC at a high multiple of a horizontal rate synchronizing signal HORZ-SYNC. Signal LLC is coupled to a frequency divider, not shown, that is included in a deflection processor 202 formed by an integrated circuit TDA 9151.

Processor 202 includes a frequency divider, not shown, having a selectable frequency division factor controlled by a signal PRESCALER. When operation in the 1 H rate is required, signal PRESCALER is at a first state. On the other hand, when the operation in the 2 H–2.4 H is required, signal PRESCALER is at a second state and the frequency division factor is one-half of that when operation in the 1 H rate is required.

A frequency divided signal OFCS at the horizontal rate is coupled to one input of phase detector 204. Horizontal rate synchronizing signal HORZ-SYNC is coupled to a second input of phase detector 204. Phase detector 204 controls the phase and frequency of signal OFCS so that they are equal to the phase and frequency of signal HORZ-SYNC, respectively.

Deflection processor 202 includes a conventional phase-control loop, not shown, that generates signal 107a. The phase of signal 107a is automatically adjusted in processor 202 in accordance with a flyback pulse signal FLY developed in winding TOW2 of FIG. 1A to be synchronized to the phase of signal HORZ-SYNC of FIG. 1B.

A microprocessor 208 generates on a bus 12C a control signal 208a that is coupled to deflection processor 202 for selectively enabling and disabling control signal 107a. When enabled, signal 107a produces periodic switching operation in output stage 101 of FIG. 1A. When disabled, signal 107a prevents the periodic switching operation in stage 101.

Microprocessor 208 is responsive to a word signal 209a generated in a frequency-to-data signal converter 209. Signal 209a has a numerical value that is indicative of the frequency of synchronizing signal HORZ-SYNC. Converter 209 includes, for example, a counter that counts the number of clock pulses, during a given period of signal HORZ-SYNC, and generates word signal 209a in accordance with the number of clock pulses that occur in the given period.

Microprocessor 208 also generates on bus 12C a control word signal 208b that is coupled to a digital-to-analog (D/A) converter 201 and a control word signal 208c that is coupled to a data register 211. Signals 208b and 208c are determined in accordance with signal 209a. Alternatively, the value of signals 208b and 208c may be determined by a signal 109b that is provided by a keyboard, not shown.

D/A converter 201 generates, in accordance with word signal 208b, an analog control signal VCO-FREQ that is coupled to VCO 207 to control the free running frequency of VCO 207 at the different scan frequencies. D/A converter 201 additionally generates, in accordance with data signal 208b, a width alignment signal WIDTH-ALIGN. Signal WIDTH-ALIGN is summed up in a summer 210 with a vertical rate parabola signal EW-GEOMETRY-WIDTH produced in deflection processor 202, in accordance with a vertical synchronization signal VERT-SYNC. Summer 210 generates parabola signal WIDTH-REF that is coupled to each of power supplies 102 and 100. Signal WIDTH-REF has a controllable direct current component to control a direct current component of supply voltage B+ for controlling the width and a vertical rate parabola component to provide for East-West distortion correction.

Register 211 generates, in accordance with word signal 208c, control signal SCSEL that controls the selection of switched S-capacitors 106 of FIG. 1 A. Register 211 additionally generates control signal 1H-VCC in accordance with signal 208c for disabling ZVS SMPS 100, when the required scan frequency is 1 H and for enabling ZVS SMPS 100, when the required scan frequency is equal to or greater than 2 H. Register 211 also generates signal PRESCALER at the first state, when requiared scan frequency is 1 H and at the second state, when the required scan frequency is 2 H–2.4 H. Accordingly, deflection processor 202 generates switch control signal 107a at the selected horizontal scanning frequency for controlling horizontal driver 103 of FIG. 1A.

During a first step of power up or start up sequence, switch control signal 107a is disabled by signal 208a of microprocessor 208 such that horizontal output transistor 104 of FIG. 1A is maintained continuously non-conductive. Also, data register 211 of FIG. 1B generates control signal 1H-VCC at a level that causes transistor Q6 of FIG. 1A to turn on and to disable ZVS SMPS 100. Thereby, output stage 101 is energized from power supply 102 that generates the lower supply voltage B+. In a second step of the power up sequence, control signal SCSEL is asserted for selecting S-shaping capacitor 106 of FIG. 1A. Also, signals PRESCALER, VCO-FREQ and WIDTH-ALIGN are asserted. Signals PRESCALER and VCO-FREQ adjust the frequency of control signal 107a, when signal 107a is enabled. In a third step that follows, signal 208a enables control signal 107a of processor 202 for providing periodic switching operation in transistor 104 of FIG. 1A at the required frequency. If the higher 2nH mode operation is selected, then, in a following fourth step, microprocessor 208 of FIG. 1B will cause Register 211 to generate, after a sufficiently long start-up delay, control signal 1H-VCC at a level that causes transistor Q6 of FIG. 1A to turn off. Thereby, the higher supply voltage B+ is generated in ZVS SMPS 100. The delay is aimed at enabling ZVS SMPS 100 only after horizontal scanning output stage 101 has been running for a sufficiently long interval and reaches steady state operation with the lower supply voltage B+.

During the run mode of operation, the procedure for changing the scanning rate from 1 H mode to 2nH mode, when initiated by the user, for example, includes a first step in which signal 107a is disabled by the operation of signal 208a of microprocessor 208 and transistor 104 of FIG. 1A is maintained nonconductive. Next, in a second step, control signals SCSEL, PRESCALER, VCO-FREQ and WIDTH-ALIGN are asserted. The operation of signal PRESCALER is to increase the frequency of signal 107a, when signal 107a is enabled, to the 2nH rate. Next, in a third step, signal 208a enables control signal 107a for providing periodic switching operation in transistor 104 of FIG. 1A at the 2nH rate. Then, in the last, fourth step, ZVS SMPS 100 is enabled via signal 1H-VCC only after horizontal scanning output stage 101 has been running for a sufficiently long interval and reaches steady state operation with the lower supply voltage B+.

The procedure for changing the scanning rate from 2nH mode to 1 H mode is similar to changing it from 1 H to 2nH except that, in the second step, the control signals correspond to the 1 H rate operation instead of to the 2nH rate operation. Also, the fourth step is not carried out. Power shut down is implemented by disabling ZVS SMPS 100 before the horizontal scanning frequency can decrease.

Advantageously, each of these mode change procedures prevents energizing the horizontal scanning output stage 101 with the higher voltage B+, when the switching operation is at the 1 H rate. Also, in each step in which signal 107a is enabled, a soft start feature is implemented by reaching the final value of duty cycle of signal 107a in a gradual manner, during several cycles. Thereby, advantageously, excessive stress in switching transistor 104 of horizontal output stage 101 is reduced for improved reliability.

What is claimed is:

1. A video display deflection apparatus capable of selectively operating at a deflection frequency selected from a range of frequencies, comprising:

a source of a synchronization signal at a frequency indicative of said selected frequency;

a deflection circuit output stage responsive to said synchronization signal for generating a deflection current at said selected deflection frequency;

a first power supply including a first power transistor for generating a first supply voltage by the operation of said first power transistor when a first deflection frequency is selected;

a second power supply including a second power transistor for generating a second supply voltage by the operation of said second power transistor when a second deflection frequency is selected; and a source of a signal indicative of said frequency of said synchronization signal for generating a first control signal that is coupled to one of said first and second power supplies for selecting, in accordance therewith, said first supply voltage to energize said deflection circuit output stage, when said first deflection frequency is selected, and said second supply voltage, when said second deflection frequency is selected, such that when said first supply voltage energizes said output stage, said second power transistor is outside a supply current path of said output stage, and, when said second supply voltage energizes said output stage, said first power transistor is outside said supply current path of said output stage.

2. A video display deflection apparatus according to claim 1, wherein each of said first and second supply voltages is selectively coupled to a common supply terminal of said deflection circuit output stage.

3. A video display deflection apparatus according to claim 2, wherein said second supply voltage is coupled to said common supply terminal via a diode that is forward-biased to couple said second power transistor to said output stage, when said second supply voltage is selected, and is back-biased to decouple said second power transistor from said output stage, when said first supply voltage is selected.

4. A video display deflection apparatus according to claim 1 further comprising, a source of a second control signal coupled to said power supply for varying a magnitude of said first supply voltage, in accordance with the frequency of said deflection current.

5. A video display deflection apparatus according to claim 1, wherein said first power supply comprises a zero voltage switching switch mode power supply.

6. A video display deflection apparatus according to claim 5, wherein said second power supply comprises a series pass regulator power supply.

7. A video display deflection apparatus according to claim 1, wherein, during a start-up interval, one of said first and said second supply voltages having a lower voltage is selected to energize said deflection circuit output stage regardless of the selected frequency.

8. A video display deflection apparatus according to claim 1, further comprising, an oscillator for generating a second control signal that is coupled to a switching transistor of said deflection circuit output stage to control a switching operation at the selected frequency, wherein, during a power-down interval, said first control signal selects the power supply that generates a lower voltage for energizing said deflection circuit output stage and wherein, during said power-down interval, a decrease in the selected frequency is prevented.

9. A video display deflection apparatus according to claim 1 further comprising, an oscillator for generating a second control signal that is coupled to a switching transistor of said deflection circuit output stage to control a switching operation at the selected frequency, wherein said first deflection frequency is higher than said second deflection frequency, and wherein, when a decrease in said deflection frequency from said first to said second frequency is required, said first control signal selects said second supply voltage to energize said output stage, during a transition interval, prior to the frequency decrease of said oscillator.

10. A video display deflection apparatus according to claim 1 further comprising, an oscillator for generating a second control signal that is coupled to a switching transistor of said deflection circuit output stage to control a switching operation at the selected frequency, wherein said first deflection frequency is higher than said second deflection frequency, wherein, when an increase in said deflection frequency from said second to said first frequency is required, said increase in said deflection frequency occurs, during a transition interval, and prior to the selection of said first supply voltage to energize said output stage.

11. A video display deflection apparatus according to claim 1, wherein said first and second power transistors share a common heat sink arrangement that removes the heat generated in only one of said transistors at any given time.

12. A video display deflection apparatus according to claim 1 wherein said first control signal source comprises a frequency detector responsive to said synchronization signal.

13. A video display deflection apparatus capable of selectively operating at a deflection frequency selected from a range of frequencies, comprising:

a source of a synchronization signal at a frequency indicative of said selected frequency;

a deflection circuit output stage responsive to said synchronization signal for generating a deflection current at said selected deflection frequency;

a first power supply for generating a first supply voltage when a first deflection frequency is selected;

a second power supply for generating a second supply voltage when a second deflection frequency is selected; and a source of a signal indicative of a frequency of said synchronization signal for generating a first control signal that is coupled to one of said first and second power supplies for selecting, in accordance therewith, said first supply voltage to energize said deflection circuit output stage, when said first deflection frequency is selected, and said second supply voltage, when said second deflection frequency is selected, such that during a start-up interval, one of said first and said second supply voltages having a lower voltage is selected to energize said deflection circuit output stage regardless of the selected frequency.

* * * * *